(12) United States Patent
Spry (10) Patent No.: US 7,584,272 B2
(45) Date of Patent: Sep. 1, 2009

(54) METHOD AND APPARATUS FOR FULLY AUTOMATED ISCSI TARGET CONFIGURATION

(75) Inventor: Andrew J. Spry, Wichita, KS (US)

(73) Assignee: LSI Corporation, Milpitas, CA (US)

(*) Notice: Subject to any disclaimer, the term of this patent is extended or adjusted under 35 U.S.C. 154(b) by 1057 days.

(21) Appl. No.: 10/968,495

(22) Filed: Oct. 19, 2004

(65) Prior Publication Data
US 2006/0085522 A1 Apr. 20, 2006

(51) Int. Cl.
*G06F 15/177* (2006.01)
(52) U.S. Cl. ...................................................... 709/220
(58) Field of Classification Search .................. None
See application file for complete search history.

(56) References Cited
U.S. PATENT DOCUMENTS 6,735,715 B1 * 5/2004 Graham ......................... 714/9
2004/0148329 A1 * 7/2004 Ogasawara et al. ......... 709/200

2005/0132360 A1 * 6/2005 Chu et al. ................... 717/177

* cited by examiner

*Primary Examiner*—Ario Etienne
*Assistant Examiner*—Clayton R Williams
(74) *Attorney, Agent, or Firm*—Suiter Swantz pc llo (57) ABSTRACT

The present invention is directed to a method and apparatus for self-configuration of iSCSI storage devices suitable for being utilized as a "plug and play" device for various network environments including direct attached, IP storage area networks with iSNS servers, and IP storage area networks without iSNS servers. The present invention may perform automatic configuration steps including network configuration, storage volume configuration, iSCSI target configuration, iSCSI initiator registration, volume to LUN mapping, and the like. The present invention may be combined with a global configuration setting in the iSCSI storage device to enable automatic configuration. In this manner, the same firmware can be utilized for iSCSI storage devices developed for multiple target markets from direct attached to large IP SANs.

5 Claims, 5 Drawing Sheets

METHOD AND APPARATUS FOR FULLY AUTOMATED ISCSI TARGET CONFIGURATION

CROSS REFERENCE TO RELATED APPLICATION

The present application herein incorporates the following United States Patent Applications by reference in their entirety:

| Filing Date | Ser. No. |
|---|---|
| Dec. 19, 2003 | 10/741,559 |
| Dec. 19, 2003 | 10/741,756 |
| Dec. 19, 2003 | 10/741,563 |

FIELD OF THE INVENTION

The present invention generally relates to the field of data storage devices, and particularly to a method of self configuration of iSCSI Storage devices suitable for being directly attached to hosts and/or utilized on an IP storage area network.

BACKGROUND OF THE INVENTION

Internet Small Computer System Interface (iSCSI) is an SCSI transport protocol for mapping of block-orientated storage data over Transmission Control Protocol/Internet Protocol (TCP/IP) networks. iSCSI builds on two widely used technologies—SCSI commands for storage and IP protocols for networking. By carrying SCSI commands over IP networks, iSCSI is used to facilitate data transfers over intranets and to manage storage over long distances. The iSCSI protocol enables universal access to storage devices and storage area networks (SANs) over standard Ethernet based TCP/IP network. These networks may be dedicated networks or may be shared with traditional Ethernet applications.

The iSCSI standard uses ancillary network protocols such as Dynamic Host Configuration Protocol (DHCP), Internet Storage Name Service (iSNS), and Service Location Protocol (SLP) to support its operation. One of the problems facing the storage industry is the management of heterogeneous storage network environments. Thus, vendors of iSCSI storage products often provide proprietary software for configuring and managing iSCSI storage devices. In medium and large IP Storage Area Networks (SANS), these ancillary protocols and management tools provide the flexibility required by many servers sharing iSCSI storage devices. However, these protocols and management tools may not be available for direct attached and small SAN situations. Further, such protocols and management tools are too complicated to make iSCSI a viable solution for direct attached and small SAN situations.

Therefore, it would be desirable to provide an iSCSI storage device equipped with plug and play operation requiring no setup and configuration of the iSCSI storage device itself. It would be also desirable to provide a method of automating configuration of direct attached iSCSI storage devices. It would be also desirable to provide a method of automating configuration of iSCSI storage devices utilized on an IP storage area network.

SUMMARY OF THE INVENTION

Accordingly, the present invention provides a method and apparatus for self-configuration of iSCSI storage devices suitable for being utilized as a plug and play device for various network environments including direct attached, IP SANs, or the like.

The present invention may provide full self-configuration steps (automatic configuration processes) including all functions that are normally required for external protocol or management. Exemplary full self-configuration steps may include 1) automatic registration of new iSCSI initiators, 2) automatic association of newly registered iSCSI initiators with unassociated iSCSI targets 3) automatic mapping of volumes to logical units and their association to an iSCSI target or initiator 4) automatic network configuration 5) automatic creation of volumes 6) automatic creation of target iSCSI configuration using automatically generated iSCSI names, portals, and portal groups and the like. Control of the automatic configuration processes may be fully defaulted or provided by hardware configuration settings similar to existing peripheral products in this class. Advantageously, the present invention may be combined with a global configuration setting in the iSCSI storage device to enable automatic configuration. In this manner, the same firmware may be used for iSCSI storage devices developed for multiple target markets from direct attached to large IP SANs.

In a first aspect of the present invention, a method for initializing network interface of an iSCSI device is provided. First, whether a configuration protocol server is available may be determined. If the configuration protocol server is available, the configuration protocol server (e.g. Dynamic Host Configuration Protocol server) may be requested to define a configuration of network interfaces for all network ports. If the configuration protocol server is not available, a default network configuration may be utilized for the configuration of network interfaces for all network ports.

In a second aspect of the present invention, a method for creating and configuring volumes in iSCSI storage devices is provided. First, whether volumes are already configured is determined. If the volumes are not already configured, then whether automated configuration is enabled may be checked. If the automated configuration is enabled, all unallocated storage resources may be converted into volumes. If the automated configuration is not enabled, manual configuration of volume may be required.

In a third aspect of the present invention, a method for target configuration of an iSCSI storage device is provided. The iSCSI target configuration method may determine how the storage resources of the iSCSI storage device are made accessible to the network. If targets have already been configured, no additional configuration is required. Otherwise, at least one iSCSI target is configured. If automatic configuration is enabled, all iSCSI targets supported by the iSCSI storage device are created. Once the iSCSI target configuration is available, iSCSI portals are created for each IP address defined during network configuration. Each iSCSI target is then associated with all iSCSI portal groups to allow the iSCSI target to be accessed by iSCSI initiators from any network interfaces of the iSCSI storage device.

In a fourth aspect of the present invention, a method for registering an iSCSI initiator for an iSCSI storage device is provided. The method may utilize a discovery session mechanism for target discovery to initiate registration. After a discovery session has been established between the initiator and the iSCSI storage device, whether the initiator is registered may be determined. Alternatively, the method may utilize a normal session login to initiate registration if an iSNS server is available for discovery in an IP SAN. If the initiator is registered, the session enters full-feature phase. Otherwise, if automatic configuration is enabled and there is an unassociated target available, the initiator is registered. During the initiator registration, an unassociated target is selected as the initiator's target, the initiator information is permanently stored in the iSCSI storage device as a registered initiator, and the initiator is associated with the selected target to allow access to the storage resources of the associated target. If there is no unassociated target available, an iSCSI session may be closed.

In a fifth aspect of the present invention, a method for mapping volumes in the iSCSI device is provided. The method may provide a unique set of logical units on the SCSI storage device. First, unmapped volumes may be located. Then, a logical unit number may be assigned to each unmapped volumes. The volume mapping may be associated with either the iSCSI target device or the registered iSCSI initiator.

The present invention may provide a complete plug and play iSCSI storage device for direct attached markets. Further, the present invention provides a complete plug and play iSCSI storage device for IP SAN with/or without iSNS servers.

It is to be understood that both the foregoing general description and the following detailed description are exemplary and explanatory only and are not restrictive of the invention as claimed. The accompanying drawings, which are incorporated in and constitute a part of the specification, illustrate an embodiment of the invention and together with the general description, serve to explain the principles of the invention.

BRIEF DESCRIPTION OF THE DRAWINGS

The numerous advantages of the present invention may be better understood by those skilled in the art by reference to the accompanying figures in which.

DETAILED DESCRIPTION OF THE INVENTION

Reference will now be made in detail to the presently preferred embodiments of the invention, examples of which are illustrated in the accompanying drawings.

The present invention is directed to a method and apparatus for self-configuration of iSCSI storage devices suitable for being utilized as a "plug and play" device for various network environments including direct attached, IP storage area networks, or the like. The present invention may provide full self-configuration steps including: a) initializing network interfaces, b) creating volumes from storage resources, c) creating iSCSI targets, d) creating iSCSI portals and portal groups, e) creating iSCSI initiator definitions when initiators connect, f) associating iSCSI initiators with iSCSI targets, g) distributing volumes to iSCSI initiators, and h) mapping volumes to iSCSI initiator logical units, and the like. Advantageously, the present invention may be combined with a global configuration setting in the iSCSI storage device to enable automatic configuration. In this manner, the same firmware can be utilized for iSCSI storage devices developed for multiple target markets from direct attached to large IP SANs.

An iSCSI storage device has been utilized by businesses and other organizations for effective ways to store and maintain data. Today's technology market offers various options such as Direct Attached Storage (DAS), Storage Area networks (SANs), or the like. DAS consists of a disk drive attached to a host computer. SANs are dedicated networks that connect servers to storage devices and transport storage traffic without burdening the Local Area Network (LAN). An iSCSI storage device which is attached to a system directly or via an IP network requires a series of configuration steps before storage can be accessed. Examples of the configuration steps may include network configuration, storage volume configuration, iSCSI target configuration, iSCSI initiator registration, volume to LUN mapping, and the like.

Conventionally, "plug and play" storage devices (e.g. devices for SCSI, IEEE 1384, and Universal Serial Bus (USB) peripheral busses) have been offered to provide instant access to a single storage volume. In the case of the SCSI peripheral bus, an external jumper or configuration switch on the device provides a way to attach multiple storage devices to the same peripheral bus without address conflicts. The USB and IEEE 1384 peripheral busses support multiple storage devices on the same peripheral bus by automatically assigning addresses to devices on the bus. Similarly, in order to provide the self-configuration of iSCSI storage devices suitable for being utilized as a plug and play device for various network environments, each of the necessary configuration steps may be automated in a manner that emulates the simpler plug and play behavior of other common storage peripheral busses. It is noted that the present invention may rely on existing network configuration services in order to provide a self-configuration of iSCSI storage devices. In the following description, numerous specific descriptions are set forth in order to provide a thorough understanding of the present invention. It should be appreciated by those skilled in the art that the present invention may be practiced without some or all of these specific details. In some instances, well known process operations have not been described in detail in order to prevent any obscurity in the present invention.

Referring generally now to FIGS. 1 through 5, exemplary embodiments of the present invention are shown.

Figure 1:
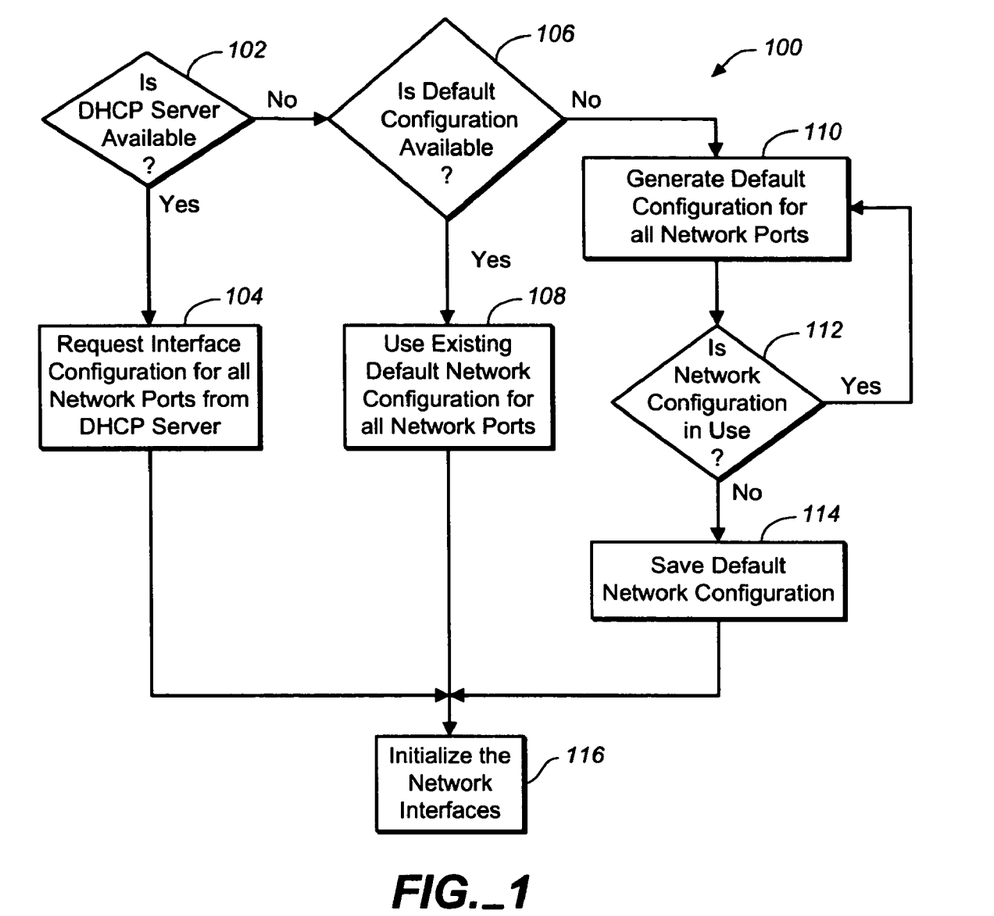
FIG. 1 is an illustration of a flow diagram implementing a method for automating network interface configuration of an iSCSI storage device in accordance with an exemplary embodiment of the present invention.

Referring to FIG. 1, a flow diagram 100 implementing an exemplary method or process for automating network configuration of an iSCSI storage device is shown. The network configuration may be required by an initiator to access the iSCSI storage device. The network configuration may be either provided in default configuration (device documentation) or accessed from the DHCP server. Generally, Dynamic Host Control Protocol (DHCP) server automatically assigns and manages reusable IP addresses to DHCP clients. The exemplary method may begin in Step 102 which determines whether a DHCP server is available. If a DHCP server is available, the DHCP server may be utilized to define the configuration of all network interfaces on the storage device in Step 104. The DHCP network configuration may include the IP address, network mask, default gateway and the like. If no DHCP server is available, whether a default network configuration is available may be checked in Step 106. If the default network configuration is available, then, a default network configuration may be utilized for all interfaces on the storage device in Step 108. The default network configuration includes just the IP address and network mask. If no default configuration is available, a default network configuration is generated in Step 110. Then, in Step 112, whether the desired IP addresses are not in use on the IP SAN may be determined. If the desired IP addresses are in use, then the method may proceed to Step 110 and generate another default interface configuration. If the desired IP addresses are not in use, the default network configuration may be saved in Step 114. Then, the method may initialize the network interfaces on the storage device based on the network interface configuration in Step 116.

The network configuration of the iSCSI storage device may be needed by the iSCSI initiator to locate the iSCSI storage device. Using the default network configuration supports direct attached or isolated IP SAN installations. The DHCP network configuration may allow multiple storage devices to be used on any IP SAN.

Figure 2:
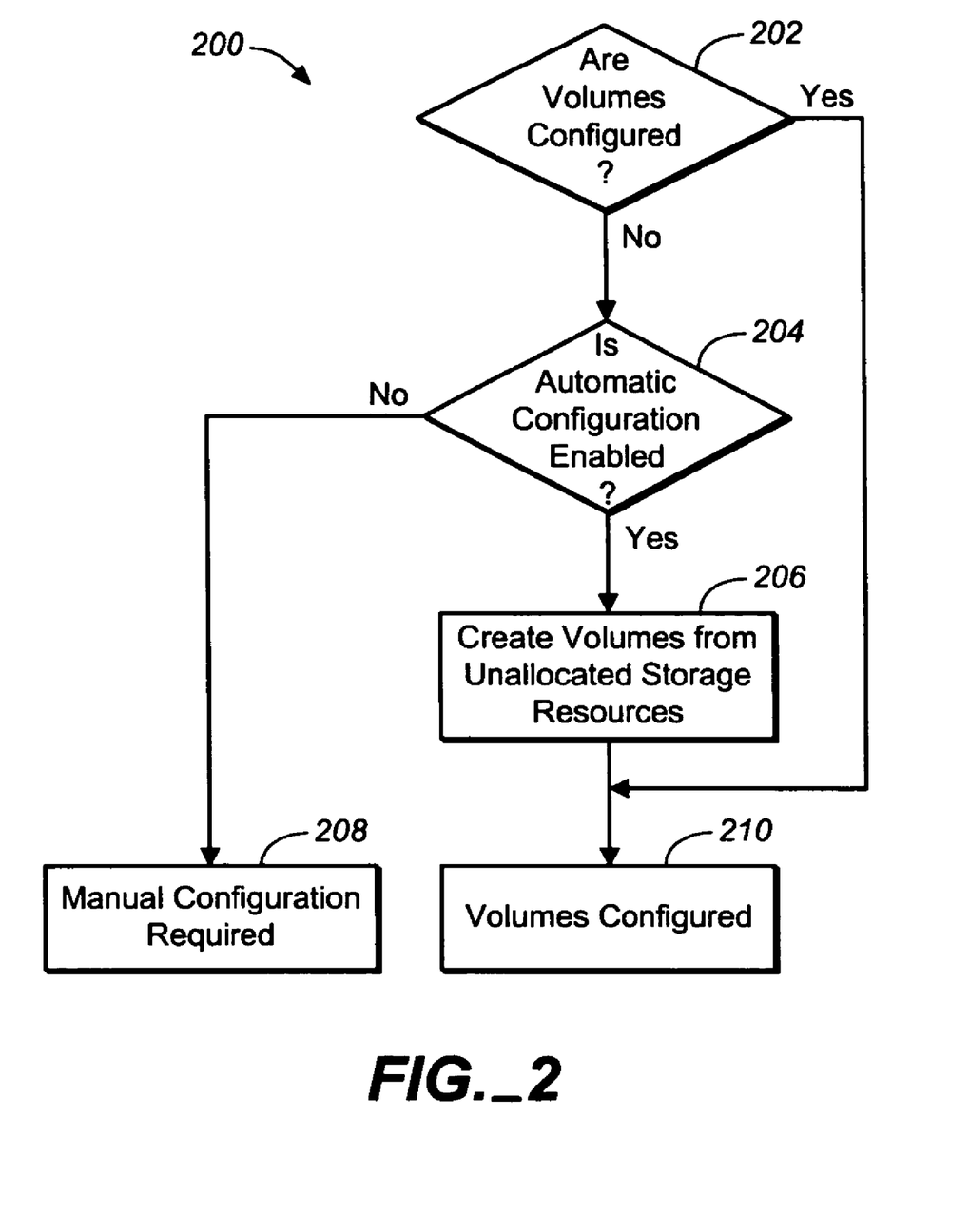
FIG. 2 is an illustration of a flow diagram implementing a method for automating volume configuration on the iSCSI storage device in accordance with an exemplary embodiment of the present invention.

Referring to FIG. 2, a flow diagram 200 implementing an exemplary method or process for automating volume configuration of an iSCSI storage device is shown. If volumes have already been configured at an earlier time, no additional configuration is required. The method may begin in Step 202 in which whether volumes already have been configured may be determined. If the volumes have been configured, the method may proceed to Step 210 to skip the volume configuration. If the volumes have not been configured, whether automatic configuration is enabled may be determined in Step 204. If automatic configuration is enabled, all unallocated storage resources are converted into volumes in Step 206. Then, the volume configuration status is set in Step 210. When automatic configuration is not enabled, manual configuration of volumes is required in Step 208.

In an embodiment of the present invention, an iSCSI-capable RAID storage device may be utilized. In such a case, the RAID level, the number of volumes, the allocation of global hot spare drives and the like may be determined from settings on physical configuration dials or switches on the RAID storage device. In the absence of any external switches or input devices, the RAID level, number of volumes, and hot spare drive creation are determined by product defaults. In a particular embodiment, a non-RAID storage device may be utilized. In such a case, the storage resource is configured as a single volume.

Figure 3:
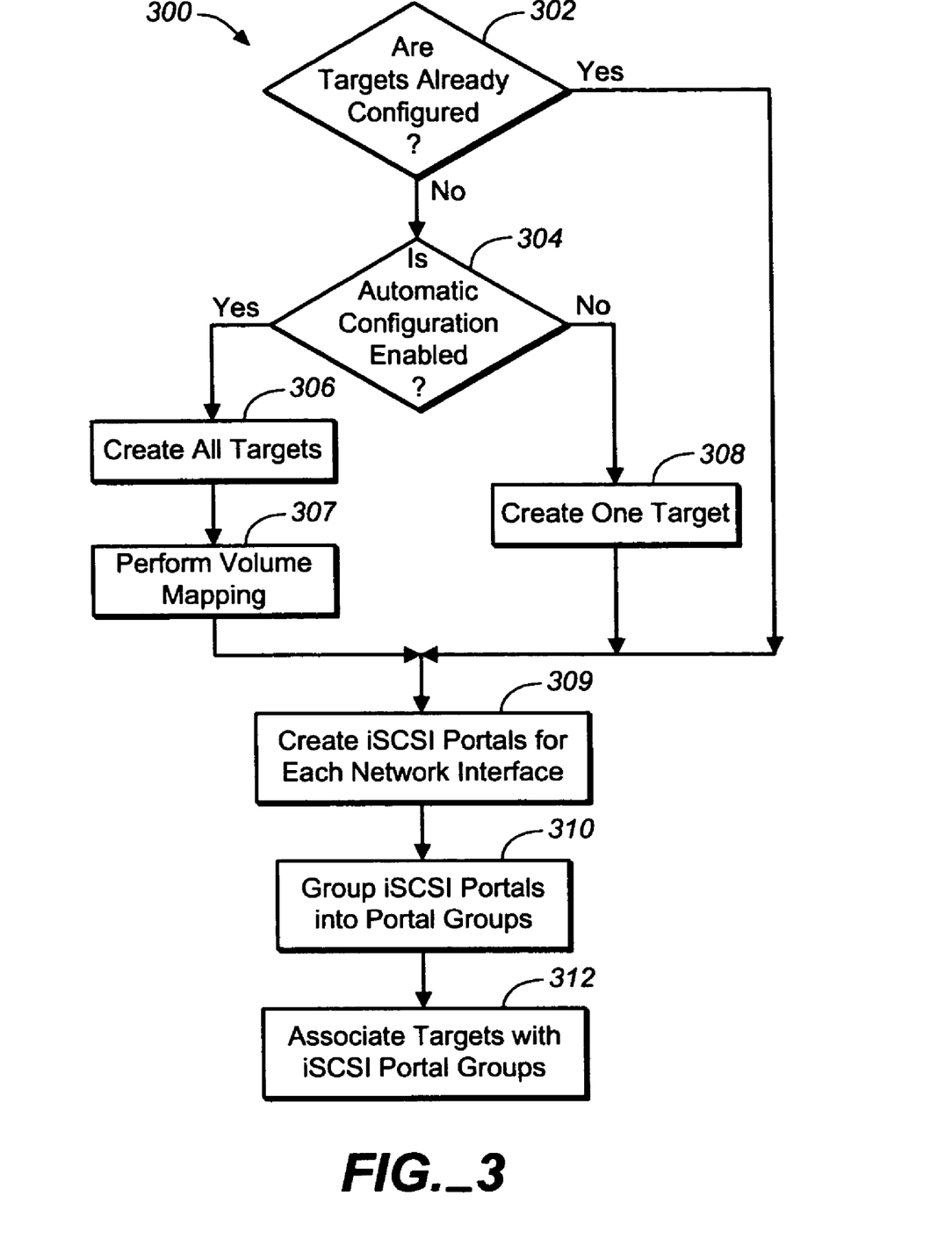
FIG. 3 is an illustration of a flow diagram implementing a method for automating target configuration on the iSCSI storage device in accordance with an exemplary embodiment of the present invention.

Referring now to FIG. 3, a flow diagram 300 implementing a method or process for automating target configuration of an iSCSI storage device is shown. The iSCSI target configuration may determine how the storage resources of the iSCSI storage device are made accessible to the network. The iSCSI target configuration may build iSCSI target, iSCSI portal, and iSCSI portal group definitions and the association between the iSCSI targets and iSCSI portal groups.

The method may begin in Step 302 which determines whether targets already have been configured. If the targets have been configured, no additional configuration is required. In such a case, the method may proceed to Step 309. Otherwise, at least one iSCSI target may be configured. In Step 304, whether automated configuration is enabled may be determined. If the automatic configuration is enabled, all iSCSI targets supported by the iSCSI storage device may be created in Step 306. The number of targets created may be a product default or specified by a physical configuration dial or switch on the storage device. In an embodiment of the present invention, each target is given a world wide unique name that specifies the fully qualified subset of storage resources in the iSCSI storage device. In a particular embodiment of the present invention, volume mapping may be associated with an iSCSI target device. In such a case, the volume mapping may be performed in Step 307. If the automated configuration is not enabled, one target for the iSCSI storage device may be created in Step 308.

Once the iSCSI target configuration is available, iSCSI portals may be created for each IP address defined during network configuration in Step 309. The iSCSI portals may be grouped into iSCSI portal groups based on internal hardware and firmware capabilities of the iSCSI storage device in Step 310. A portal group is created for each set of portals that can be managed from the session layer of the iSCSI storage device. In an embodiment of the present invention, portal group numbers may be assigned to support fail-over of sessions opened by initiators with multiple iSCSI interfaces. In Step 312, each iSCSI target may be associated with all iSCSI portal groups to allow the iSCSI target to be accessed by iSCSI initiators from any of the iSCSI storage device's network interfaces.

In a particular embodiment of the present invention, the iSCSI portals of the iSCSI target configuration may support any single level of IPsec Security (Internet Protocol security) based on their TCP listening port. IPsec is a set of protocols developed to support secure exchange of packets at the IP layer. The security level can be selected from a set of canned security policies via a physical configuration dial or switch or based on a product default. If any IPsec security policy other than clear text is used for iSCSI sessions, the initiator's IPsec configuration must be set to access the iSCSI target device via the TCP listening port used for all iSCSI portals. The iSCSI configuration may be linked to IPsec security policy based on TCP listening port so as to allow zero target configuration of IPsec for the iSCSI storage device.

Figure 4:
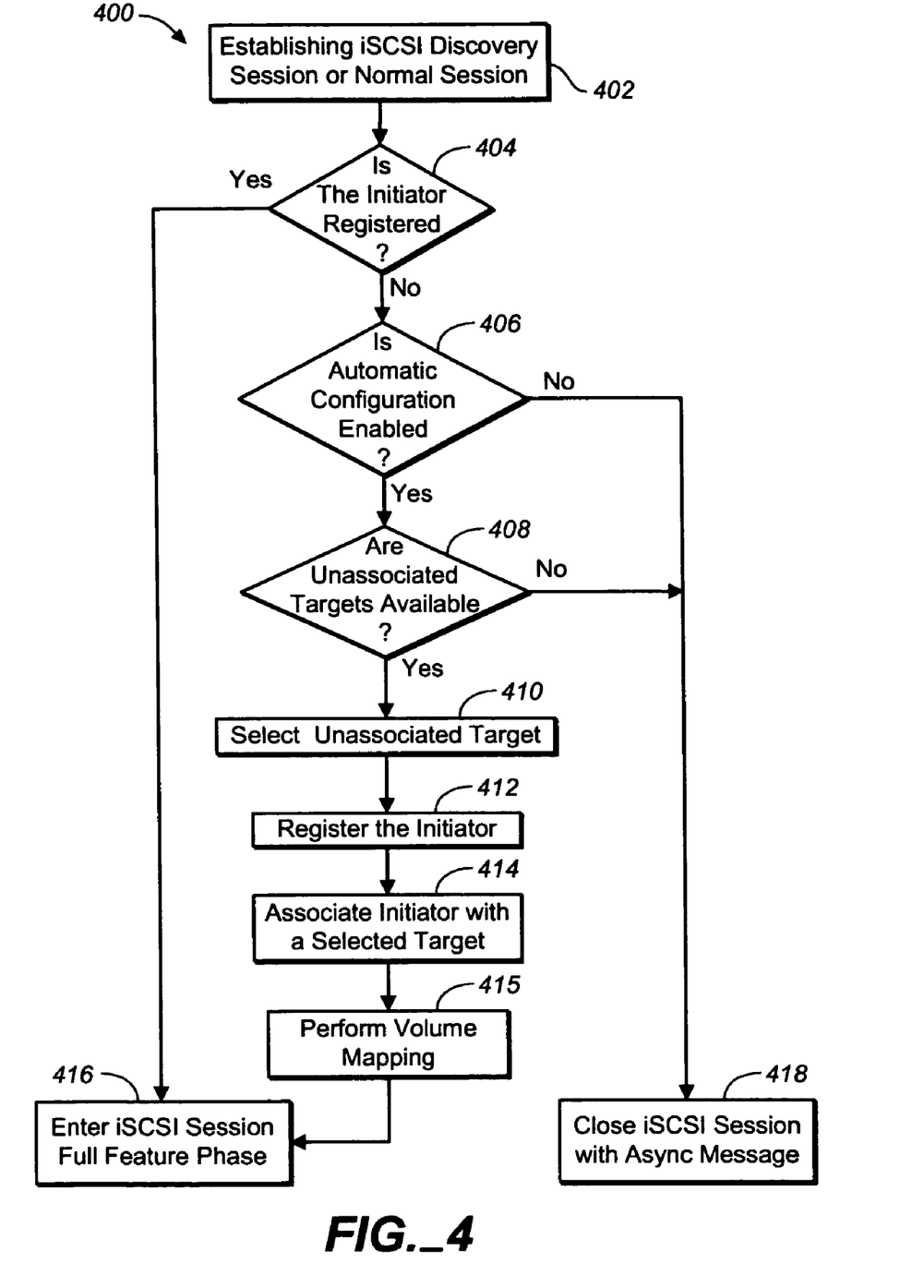
FIG. 4 is an illustration of a flow diagram implementing a method for registering initiator of the iSCSI storage device in accordance with an exemplary embodiment of the present invention.

The initiator registration step may determine which initiators obtain access to which automatically configured iSCSI targets on the iSCSI storage device. Once an initiator has been registered with the iSCSI storage device, a permanent association between the initiator and target is formed. Referring now to FIG. 4, a flow diagram 400 implementing an exemplary method for automating iSCSI initiator registration is shown. In a particular embodiment of the present invention, the iSCSI initiator registration process may utilize an iSCSI lightweight discovery session mechanism for target discovery to initiate registration in Step 402. In an alternative embodiment of the present invention, in Step 402, the iSCSI initiator registration process may utilize a normal iSCSI session login to a specific iSCSI target to initiate registration if an iSNS server is available for discovery in the IP SAN. After a session login has been established between the initiator and the iSCSI storage device, whether the initiator is registered may be determined in Step 404. If the initiator is already registered, the method may proceed to Step 416. Then, the session enters full-feature phase in Step 416 since initiator registration may not be necessary. If the initiator is not registered, whether automatic configuration is enabled may be determined in Step 406. If the automated configuration is enabled, the method may check whether any unassociated target is available in Step 408. If any unassociated target is available, the method may select an unassociated target as a target for the initiator. During initiator registration, an unassociated target is selected as a target for the initiator. Then, the initiator may be registered in Step 412.

The initiator information is permanently stored in the iSCSI storage device as a registered initiator. In Step 414, the initiator may be associated with the selected target to allow access to storage resources of the selected target. In a particular embodiment of the present invention, volume mapping may be associated with a registered iSCSI initiator. In such a case, the volume mapping may be performed in Step 415. The session enters full-feature phase in Step 416. When there is no unassociated target available, the method may proceed to Step 418 to close iSCSI session with Async Message (e.g. an asynchronous logout request message, close session message, or the like) defined by the iSCSI protocol. In an embodiment of the present invention, after the session has entered full-feature phase, the iSCSI storage device may respond to SendTargets discovery requests with only the iSCSI target associated with the initiator. For un-registered initiators, the SendTargets reply is empty. The iSCSI storage device can also close the session for unregistered initiators with an asynchronous logout request.

Figure 5:
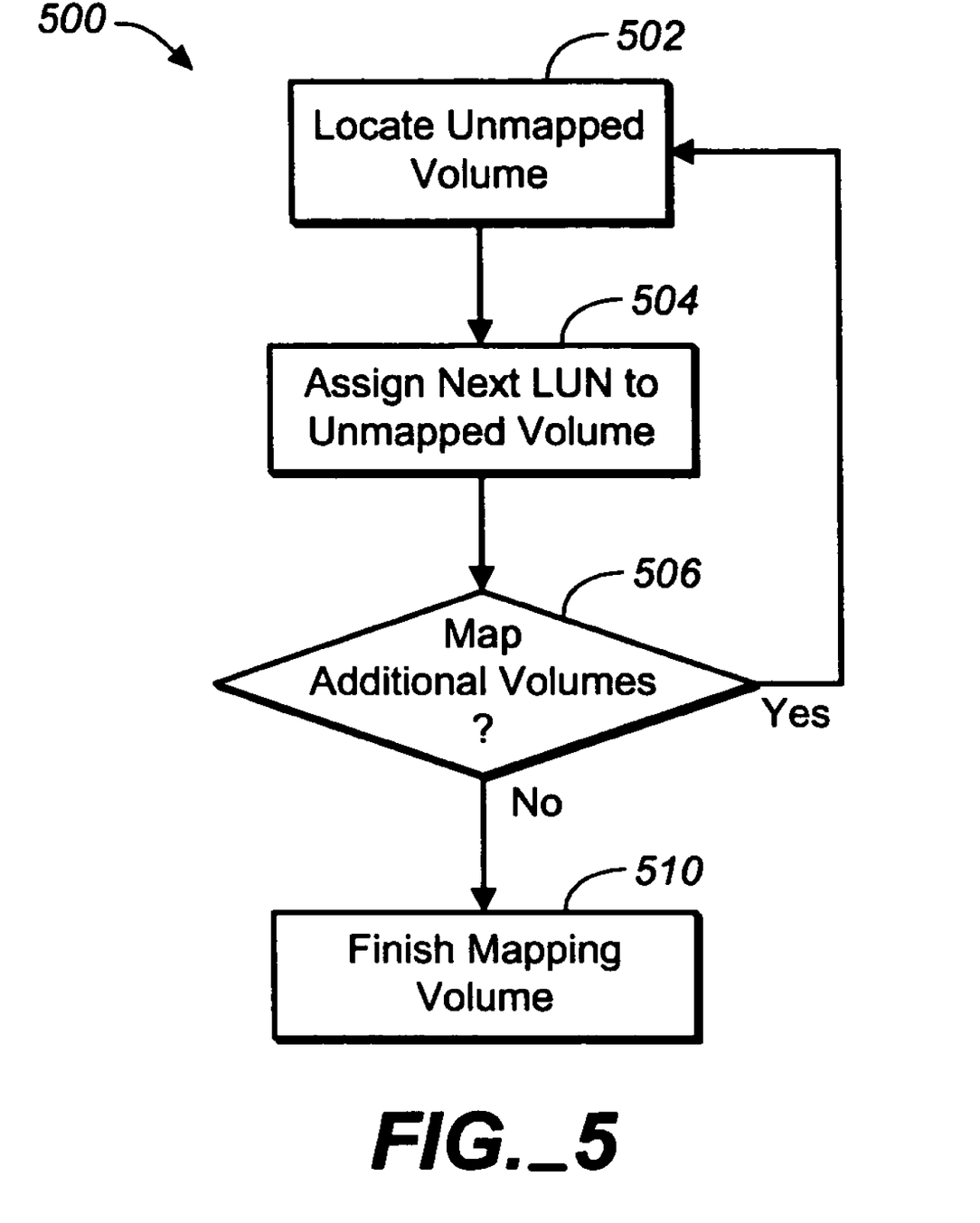
FIG. 5 is an illustration of a flow diagram implementing a method for mapping unmapped volumes on the iSCSI storage device in accordance with an exemplary embodiment of the present invention.

During volume mapping, one or more unmapped volumes may be assigned logical unit numbers. The logical unit numbers must be unique within the map but can be any values. For instance, the volume mapping may start assigning logical unit numbers at zero and increment the number for each volume mapped. The number of volumes included in a mapping may be specified by an external configuration switch or determined by a product specific default. The volume mapping may be associated with either the iSCSI target device or the registered iSCSI initiator. Referring back to FIG. 3, the volume mapping may be performed in Step 307 after each target is created. Referring back to FIG. 4, the volume mapping may be performed in Step 415 when the initiator is registered. Referring now to FIG. 5, a method 500 for mapping volumes on the iSCSI storage device is shown. The method may provide a unique set of logical units for each time when a registered initiator logs into its associated target for a normal iSCSI session. In Step 502, an unmapped volume may be located. Then, a logical unit numbers (LUN) may be assigned to the unmapped volume in Step 504. The method may determine whether an additional volume is unmapped in Step 506. If there are additional volumes to be mapped, the method may proceed to Step 502 to locate an unmapped volume.

The present invention may rely on existing network configuration services in order to provide a full self-configuration of iSCSI storages. The Full self configuration may include 1) Automatic registration of new iSCSI initiators, 2) Automatic association of newly registered iSCSI initiators with unassociated iSCSI targets 3) Automatic mapping of volumes to logical units and their association to an iSCSI target or initiator 4) automatic network configuration 5) Automatic creation of volumes 6) Automatic creation of target iSCSI configuration using automatically generated iSCSI names, portals, and portal groups. Those skilled in the art will appreciate that control of the process may be fully defaulted or provided by hardware configuration settings similar to existing peripheral products in this class.

In a particular embodiment, initiators may use the automatically configured iSCSI storage device with either minimal or no configuration. For example, in a direct attached use of the iSCSI storage device, only a single iSCSI storage device IP address is configured on the initiator to locate the iSCSI storage device. Additionally, in an IP SAN environment without an iSNS server, each initiator that accesses the iSCSI storage device may be configured with a single iSCSI storage device IP address. On the initial connection from each initiator, the iSCSI storage device may register the initiator and make its storage resources available to the initiator. Further, the present invention may be utilized in an IP SAN with an iSNS server. In that environment, the iSCSI target, portal, and portal group configuration is exported to the iSNS server. Each initiator also exports its iSCSI name to the iSNS server. The associations between initiator and target are programmed on the iSNS server. In this environment, the iSCSI initiator registration and its association with the target may occur when the initiator logs into the target on the iSCSI storage device as specified by the iSNS configuration. If secure sessions are desired, the present invention may be able to be extended to support a single security policy for all sessions on the iSCSI storage device by using the security policy's TCP listening port to configure the initiator IPsec layer to access the iSCSI storage device's secure portals.

Additionally, the present invention may include optional hardware switches on the iSCSI storage device to control automatic configuration options. It is contemplated that the present invention may allow the same iSCSI storage device with automatic configuration setting controlled by an external switch to be used in environments where full manual configuration is desired or required.

It should be appreciated that the exemplary configuration sequences may support a number of variants that provide equivalent automatic configuration capabilities. For instance, one variation may not provide global automatic configuration setting. In such a case, the variation may make automatic configuration utilizing the default operation mode. This variation may limit the use of the system to low-end environments where manual configuration is not needed. Another variation may be to perform iSCSI initiator registration during the initial login of an iSCSI initiator to a specific unassociated target. This requires a-prior knowledge of the automatically generated iSCSI target names on the iSCSI storage device so they can be added to the iSCSI initiator configuration or the use of an iSNS server to gather information and define the initiator and target associations.

In the exemplary embodiments, the methods disclosed may be implemented as sets of instructions or software readable by a device. Further, it is understood that the specific order or hierarchy of steps in the methods disclosed are examples of exemplary approaches. Based upon design preferences, it is understood that the specific order or hierarchy of steps in the method can be rearranged while remaining within the scope and spirit of the present invention. The accompanying method claims present elements of the various steps in a sample order, and are not necessarily meant to be limited to the specific order or hierarchy presented.

It is to be understood that the present invention may be conveniently implemented in forms of software package. Such a software package may be a computer program product which employs a storage medium including stored computer code which is used to program a computer to perform the disclosed function and process of the present invention. The storage medium may include, but is not limited to, any type of conventional floppy disks, optical disks, CD-ROMS, magneto-optical disks, ROMs, RAMs, EPROMs, EEPROMs, magnetic or optical cards, or any other suitable media for storing electronic instructions.

It is believed that the method and apparatus of the present invention and many of its attendant advantages will be understood by the forgoing description. It is also believed that it will be apparent that various changes may be made in the form, construction and arrangement of the components thereof without departing from the scope and spirit of the invention or without sacrificing all of its material advantages. The form herein before described being merely an explanatory embodiment thereof, it is the intention of the following claims to encompass and include such changes.

What is claimed is:

1. A method for automatically configuring network interfaces on an iSCSI storage device, comprising:
   determining if a Dynamic Host Configuration Protocol server is available;
   utilizing said Dynamic Host Configuration Protocol server to define a configuration of the network interfaces of the iSCSI device when the Dynamic Host Configuration Protocol server is available;
   determining if a default network configuration for the network interfaces is available when the Dynamic Host Configuration Protocol server is not available;
   utilizing said default network configuration for the network interfaces on the iSCSI storage device when the default network configuration is available;
   generating a default interface configuration for the network interfaces on the iSCSI storage device with desired Internet Protocol addresses when the default network configuration for the network interfaces is not available and the Dynamic Host Configuration Protocol server is not available;
   storing the generated default interface configuration for the network interfaces on the iSCSI storage device after desired Internet Protocol addresses are verified; and
   initializing the network interfaces on the iSCSI storage device,
   wherein the iSCSI storage device is a plug and play device suitable for being utilized for direct attached and IP Storage Area Network and configuring of the network interfaces is utilized by an initiator in order to access the iSCSI storage device.

2. The method as described in claim 1, wherein the Dynamic Host Configuration Protocol server generates a Dynamic Host Configuration Protocol network configuration including an IP address, a Network mask, and a default gateway.

3. The method as described in claim 1, wherein the default network configuration includes an IP address and a network mask.

4. The method as described in claim 1, further comprising:
   utilizing the default network configuration to support direct attached IP Storage Area Network installations.

5. The method as described descried in claim 1, further comprising:
   utilizing the default network configuration to support isolated IP Storage Area Network installations.

* * * * *